3,243,160
CABLE HANDLING DEVICE
Charles F. Salmen, 148 Lucinda Lane,
Pleasant Hill, Calif.
Filed Oct. 3, 1963, Ser. No. 313,651
5 Claims. (Cl. 254—134.3)

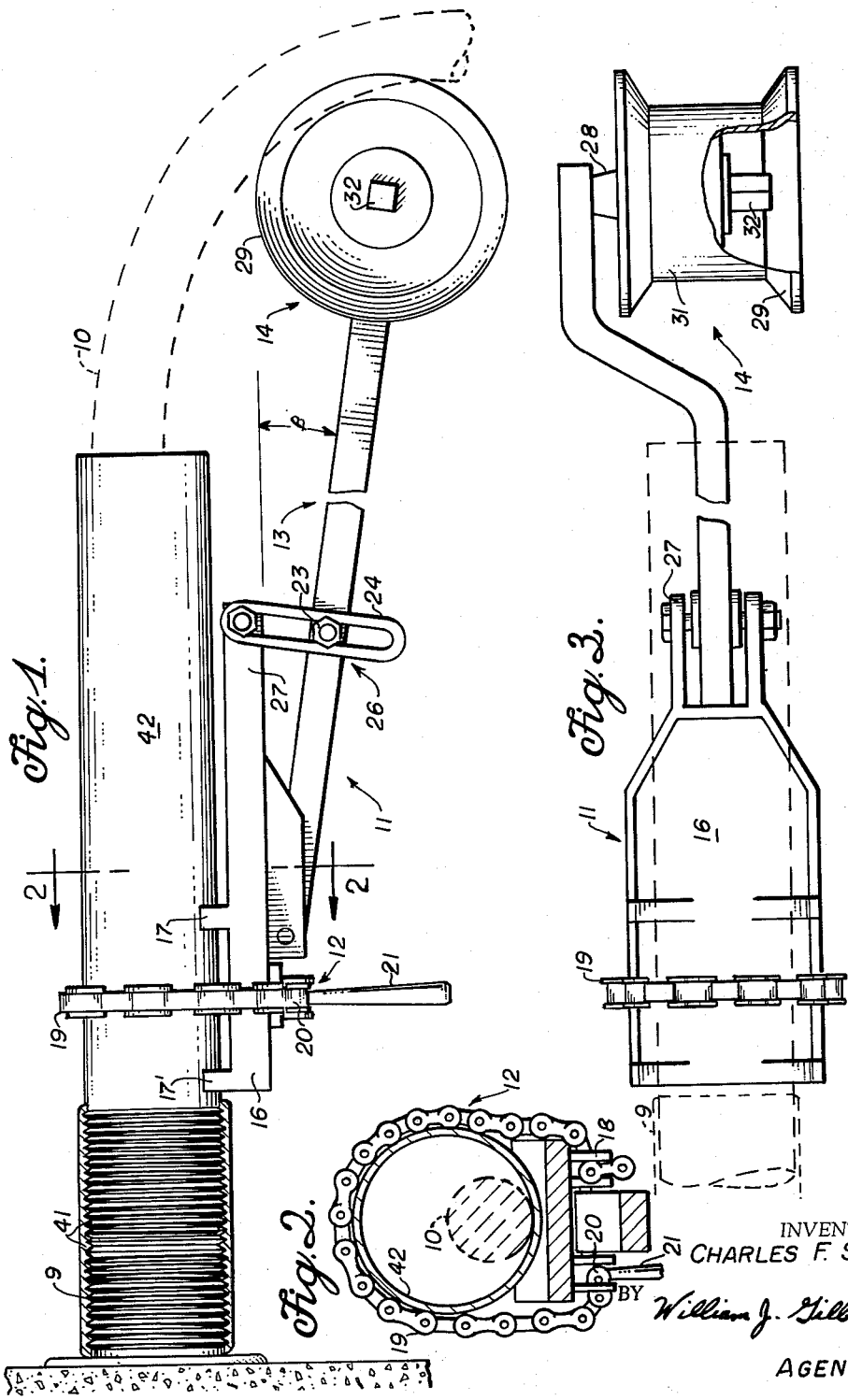

The present invention relates to a unique device for handling cable.

More specifically stated, the instant invention has to do with disposing electrical cables within electrical cable conduits; both guiding cables therein and pulling cables therethrough. It is within the scope of this invention to handle these cables either singly or in bundles. Further, the present invention has proven particularly useful in handling large electrical cables.

As it is will known to all those familiar with the art of handling electrical cables, the problems in disposing cables within cable conduits are manifold. One of these problems is that, unless carefully guided into the mouths of the cable conduit, an abrasive action occurs which tends to violate the integrity of the insulating medium. For the relatively non-limber, large cables this guiding operation has heretofore generally necessitated manual manipulation. The expense entailed in one or more men having to be involved in this guiding operation is manifest. As it is also well known, another basic problem in this art is the pulling of these cables through the cable conduits.

Various devices have been used in attempting to deal with these problems. These devices, however, have not proven completely satisfactory . . . for various reasons. Some are objected to due to their massiveness and relative non-portability. Others have proven too expensive and mechanically complex for the ordinary problems of the art. Still others lack sufficient versatility to handle a plurality of cable sizes. And none are adaptable to, alternatively, guide and pull electrical cables through cable conduits. What is needed, then, is an easily portable, relatively lightweight, mechanically simple (both in construction and in operation), inexpensive and versatile cable handling device. It is particularly desired that this device be capable of both guiding and pulling cables.

The present invention improves this art of handling electrical cable through the use of such a unique and desirable device. This single inventive device is adaptable to not only guide electrical cable into cable conduits; it it also adaptable to pull electrical cables therethrough. In addition it possesses all those desirable attributes listed above.

Broadly, the instant inventive device comprises the combination of a vise means adaptable to be detachably clamped about a rigid body, an elongated mast pivotably connected to said vise means and a cable support means mounted upon the non-pivoted end of said mast.

A preferred embodiment of this cable handling device comprises the combination of a simulated pipe vise (including a body portion which defines cradle means), an elongated mast pivotably affixed to the non-cradle portion of said body portion, means for selectively maintaining said mast at a desired angle of pivot from said body portion and a rotatably disposed pulley wheel (including an axially extending shank adapted for insertion into a power wrench) mounted upon the non-pivoted end of said mast.

Accordingly, it is a primary object of the present invention to provide a device for both guiding and pulling electrical cable through an electrical cable conduit.

Another object of the invention is to provide a cable handling device which is lightweight and easily portable.

It is a further object of this invention to provide a cable handling device which is mechanically simple . . . both in construction and in operation.

It is still further an object of the invention to provide a cable handling device which is capable of handling a large range of cable sizes and/or bundles.

Other objects of the instant invention will be more readily ascertained from an inspection of the following specification, taken in conjunction with the accompanying drawing, while the features of novelty will be more distinctly pointed out in the appended claims.

In the accompanying drawing, FIGURE 1 is a plan view of a preferred embodiment of the cable handling device.

FIGURE 2 is a slightly enlarged cross sectional view taken at line 2—2 of FIGURE 1.

FIGURE 3 is a back view of the embodiment depicted in FIGURE 1.

In the figures, like characters have been applied, where applicable, to like elements.

Referring now to the drawing and more particularly to FIGURES 1 and 3 thereof, there is shown a preferred embodiment of a cable handling device 11 comprising a vise means 12, an elongated mast 13 pivotably connected to vise means 12 and a cable support means 14 mounted upon the non-pivoted end of mast 13.

With particular reference to FIGURES 1 and 2, a preferred embodiment of vise means 12 is seen to be a simulated pipe vise which comprises a body portion 16 that defines both a pair of generally V-shaped cradles 17, 17' and a spur 18. This simulated pipe vise further comprises a strap chain 19 (one end of which is affixed to body portion 16 and the other end of which is adapted to be disposed within spur 18) and jack-screw, chain tightening means 20. This embodiment of vise means 12 has been found particularly desirable in that it is lightweight, mechanically simple, easy to operate and comparatively inexpensive to manufacture. These attributes have been even more fully realized by casting body portion 16, elongated mast 13 and cable support means 14 of aluminum metal.

Once more with reference to FIGURE 1, elongated mast 13 is seen to be pivotably connected to body portion 16 via pivot means 22. It is further shown that mast 13 is selectively held at a variable angle $\beta$ from body portion 16 by means of nut and bolt 23 which transpierces guide 24 of pivot maintaining means 26. It is still further seen that pivot maintaining means 26 is pivotably affixed to the yoke 27 defined by body portion 16.

With reference to FIGURE 3, the cable support means 14 is seen to comprise a spindle 28 affixed to the non-pivoted end of mast 13 and pulley wheel 29 (which defines a circumferential channel 31 and shank 32) rotatably mounted about spindle 28. It is to be noted that the function of previously described mast 13 is to maintain a tangent line of circumferential channel 31 directed towards the axis of a cable conduit 9.

As is readily apparent to all those familiar with the art, the present invention could be employed to guide or pull cable through variously oriented cable conduits. However, in those instances which employ cable conduits disposed within concrete walls—as depicted in FIGURE 1—the conduits often do not sufficiently extend to permit engagement with the simulated pipe vise of the present invention. The presents no real problems because the National Electrical Code requires the slightly extending conduit to be affixed to a threaded grounding bushing—pictorially depicted in FIGURE 1 as bushing 41. This coupling allows a cable conduit extension 42 to be coupled to conduit 9 . . . thereby easily providing means to which the present invention may be clamped.

Once more with reference to the drawing, particularly FIGURES 1 and 2 thereof, the simulated pipe vise operates as follows: cable handling device 11 is held such that cradles 17, 17' are adjacent cable conduit extension 42. Then strap chain 19 is wrapped about extension 42 and fitted into spur 18. Finally, the handle 21 of chain tightening means 20 is rotated such that strap chain 19 and cradles 17, 17' coact to clamp about cable conduit extension 42. Of course while the device is shown clamped about a cable conduit extension, it obviously could clamp about an actual cable conduit. Also, while the conduit and extension thereof are shown as vertically oriented, the device is operable upon any orientation of cable conduit.

FIGURE 1, then, depicts a preferred embodiment of a cable handling device 11 clamped about a vertically oriented conduit extension 42 so as to support a fed cable 10 and guide this cable through conduit extension 42 and into a cement encased cable conduit 9. In this manner, various sizes and bundles of cables are able to be fed into the mouths of cable conduits, without having to be manually guided, even though the mouth of the conduit may be twenty or more feet above ground level. It is to be noted that pivot angle β can be adjusted so that even the relatively non-limber large cables can be guided into the mouth of the cable conduit without abrasion. This result in easily achieved by slightly loosening nut and bolt 23, feeding the cable over support means 14 and into conduit 9 so that mast 13 swings to support the cable at the peak of the natural curve thereof, and then tightening nut and bolt 23 to maintain the thus determined pivot angle β. This support at the natural curve of the cable not only prevents abrasive damage to the cable, it also serves to minimize the force necessary to pull the cable through the conduit.

An equally important function of this tool is to pull cables through cable conduits. This is accomplished by clamping the device about a cable conduit (near the foot thereof), threading a flexible line through the conduit, affixing one end of the flexible line to the cable to be pulled and the other end about pulley wheel 29 and then rotating pulley wheel 29 . . . preferably by a power pipe threading wrench. The net effect of this process is that device 11 is used in the manner to a winch to pull cable through a conduit. It is to be particularly noted that a preferred size of shank 32 is a square one inch by one inch. This enables it to mate with the standard size power pipe threading wrench.

From the preceding specification, it will be readily apparent that the stated objectives, among other objects, have been achieved. It should now be apparent that the instant invention is capable of a number of modifications. For instance, while a simulated pipe vice has been shown to possess a particular utility, a variety of means could be employed to clamp the cable handling device to the cable conduit. Also, while a rotatable pulley wheel having a circumferential channel is preferred as a cable support means, various substitutes are available within the scope of the present invention. And finally, although a single, pivotable mast is used to properly position the cable support means with reference to the cable conduit, other means are possible. Therefore, it is intended that the present invention be limited solely by the scope of the appended claims.

What is claimed is:

1. A cable handling device for disposing cable within a conduit, the combination comprising
    (a) a vise means adapted to detachably clamp about said conduit,
    (b) an elongated mast defining first and second ends, the first end of said mast pivotably attached to said vise means adjacent one end thereof,
    (c) a cable support means mounted upon the second end of said mast, and
    (d) a pivot maintaining means affixed to said vise means adjacent the other end thereof and operatively connected to said mast intermediate its ends for selectively maintaining said elongated mast at a desired angle of pivot from said vise means.

2. The cable handling device recited in claim 1 wherein said vise means comprises a simulated pipe vise.

3. The cable handling device recited in claim 1 wherein said conduit defines a longitudinal axis and wherein said cable support means comprises
    (a) a spindle affixed to the second end of said mast at a right angle to both said mast and the longitudinal axis of said conduit, and
    (b) a pulley wheel rotatably disposed about said spindle whereby a tangent line of the circumference of said pulley is directed at the longitudinal axis of said conduit.

4. The cable handling device according to claim 3 wherein an axial extension of the pulley wheel of said cable support means defines a shank adapted for insertion into a pipe threading wrench.

5. A cable pulling and guiding device for disposing cable within a conduit having a longitudinal axis, the combination comprising
    (a) a simulated pipe vise including a body portion which defines both a pair of generally V-shaped cradles on a first side thereof and a pivot means adjacent one end of an opposing side thereof, and a strap chain and chain tightening handle mounted on said body portion and adapted to co-act with said generally V-shaped cradles to clamp said body portion to said conduit,
    (b) an elongated mast defining first and second ends, the first end of said mast pivotally attached to said body portion at said pivot means thereof for pivotal motion about an axis perpendicular to the longitudinal axis of said conduit,
    (c) a pivot maintaining means affixed to said body portion adjacent the other end thereof and operatively connected to said mast intermediate its ends for selectively maintaining said elongated mast at a desired angle of pivot from said body portion,
    (d) a spindle affixed to the second end of said mast at a perpendicular angle to both said mast and the longitudinal axis of conduit, and
    (e) a pulley wheel rotatably disposed about said spindle whereby a tangent line of the circumference of said pulley is directed at the longitudinal axis of said conduit and wherein said axial extension of said pulley wheel defines a shank adapted for insertion into a pipe threading wrench.

References Cited by the Examiner

UNITED STATES PATENTS 2,221,903 11/1940 Abramson et al. _____ 254—134.3
2,297,164 9/1942 Rainwater.
3,190,616 6/1965 Oleson.

WILLIAM FELDMAN, *Primary Examiner.*

OTHELL M. SIMPSON, *Examiner.*